(12) United States Patent
Miyazawa

(10) Patent No.: US 8,013,848 B2
(45) Date of Patent: Sep. 6, 2011

(54) IMAGE DISPLAY APPARATUS

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 957 days.

(21) Appl. No.: 11/734,085

(22) Filed: Apr. 11, 2007

(65) Prior Publication Data

US 2008/0037119 A1 Feb. 14, 2008

(30) Foreign Application Priority Data

Apr. 12, 2006 (JP) ................. 2006-109468
Feb. 22, 2007 (JP) ................. 2007-041843

(51) Int. Cl.
*G09G 5/00* (2006.01)

(52) U.S. Cl. ...................... 345/204; 359/453

(58) Field of Classification Search ............. 345/204; 359/453; 353/94
See application file for complete search history.

(56) References Cited

U.S. PATENT DOCUMENTS

| 7,075,622 B2 * | 7/2006 | Narimatsu ............... 355/67 |
| 7,403,318 B2 * | 7/2008 | Miyazawa et al. ....... 359/242 |
| 2003/0090751 A1 * | 5/2003 | Itokawa et al. .......... 358/538 |
| 2003/0169247 A1 * | 9/2003 | Kawabe et al. .......... 345/204 |
| 2005/0094110 A1 * | 5/2005 | Nakamura ............... 353/85 |

FOREIGN PATENT DOCUMENTS

| JP | A 6-138386 | 5/1994 |
| JP | A 2006-113229 | 4/2006 |
| JP | A 2006-154025 | 6/2006 |

* cited by examiner

*Primary Examiner* — Kevin Nguyen
*Assistant Examiner* — Kenneth B Lee, Jr.
(74) *Attorney, Agent, or Firm* — Oliff & Berridge PLLC

(57) ABSTRACT

An image display apparatus includes a light source; a light modulation element modulating illumination light coming from the light source on the basis of image data; an illumination area modification unit capable of reducing an illumination area for the light modulation element in order to illuminate a specific image-forming area in the image-forming area of the light modulation element; and an image display-processing unit having an illumination area control unit for controlling the illumination area modification unit and a resolution conversion unit for converting a resolution of the image data into a resolution corresponding to the specific image-forming area.

16 Claims, 14 Drawing Sheets

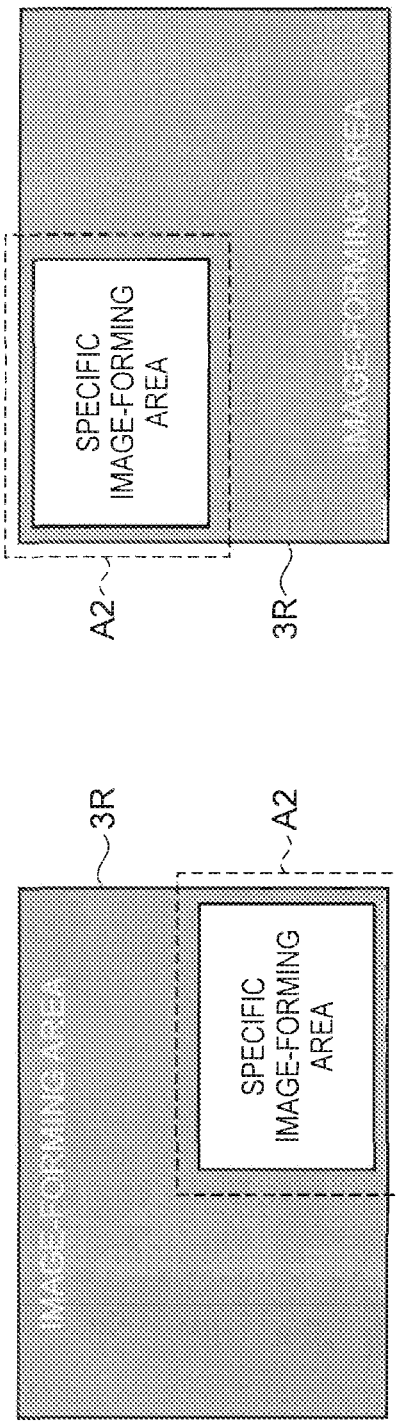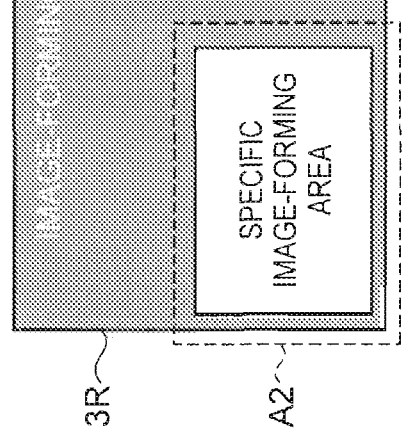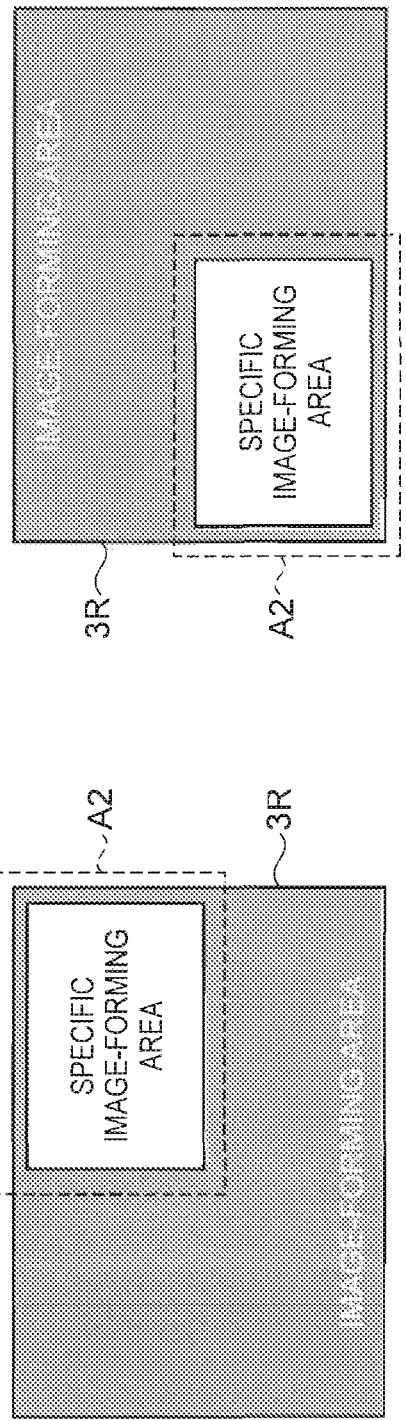

IMAGE DISPLAY APPARATUS

BACKGROUND

1. Technical Field

The present invention relates to an image display apparatus and an image display control apparatus used in the image display apparatus.

2. Related Art

There are known a rear projection type projector configured to project an image on a rear side of a screen using a wide-angle lens or a reflecting mirror and a front projection type projector configured by modifying the arrangement of optical systems being used in the rear projection type projector.

In the rear projection type projector used in an image display apparatus such as a projection television (referred to as the projection TV), a projection optical system is generally designed with the assumption that the distance between a projection lens and the screen is fixed, and the projection lens does not have a zoom function of enlarging or reducing the projection image.

The projection TV generally has a structure in which the optical axis of the projection lens is not perpendicular to a display surface in order to make the apparatus housing thinner.

JP-A-6-138386 is an example of the related art.

Since the projection TV has such a structure, moiré patterns may be generated from optical strain or interference between the screen and projection light. However, the projection optical system only has a function of providing a small zoom as a countermeasure to the moiré patterns. Moreover, in the projection TV, it is impractical to provide the projection optical system with a zoom function for changing a screen size.

The same can be said for the image display apparatus such as the projection TV but also for an image display apparatus (see FIG. 16) using a fixed-focus front projection type projector configured by modifying the arrangement of optical systems being used in the rear projection type projector. As shown in FIG. 16, such an image display apparatus can project a large screen image on a display surface 5 by installing a projector PJ at the proximity of the display surface 5.

It is desirable that programs such as sports or movies are watched on a large screen or a high-definition screen when TV programs are watched on the projection TV. However, it is considered that it is not necessary to watch news or entertainment programs on the large screen or the high-definition screen. In addition, news, entertainment programs, or the like are watched for much time and there are many situation that viewers do not watch the programs with interest and just kill time. In such a situation, it is not considered that the large screen and the high-definition screen are necessarily displayed.

Contrary to such a circumstance, a larger screen and high-definition screen have been progressed and also a brighter screen has been advanced in the projection TV and the like. That is, the programs for which the large screen and high-definition screen are not necessary are displayed on the large screen and high-definition screen. Consumption of unnecessary electric power is undesirable in terms of the energy save. It is also undesirable to consume the unnecessary electric power in the image display apparatus using the fixed focus front projection type projector described above, the direct viewing type liquid crystal TV with a large screen, a plasma TV with large screen, or the like as well as the projection TV.

Meanwhile, the technology disclosed in JP-A-6-138386 described above provides the projection lens making the image display apparatus using a projector smaller and provides a small and thin image display apparatus by using the projection lens. However, there are the foregoing drawbacks even in the technology disclosed in JP-A-6-138386.

SUMMARY

An advantage of some aspects of the invention is that it provides an image display apparatus and an image display control apparatus used in the image display apparatus capable of controlling an illumination optical system so as to change a display screen size and decreasing the output of a light source when the display screen size is reduced, thereby reducing power consumption.

According to a first aspect of the invention, there is provided an image display apparatus including a light source; a light modulation element modulating illumination light coming from the light source on the basis of image data; an illumination area modification unit capable of reducing an illumination area for the light modulation element in order to illuminate a specific image-forming area in the image-forming area of the light modulation element; and an image display-processing unit having an illumination area control unit for controlling the illumination area modification unit and a resolution conversion unit for converting a resolution of the image data into a resolution corresponding to the specific image-forming area.

The image display apparatus may have a function capable of reducing the illumination area of the light modulation element in order to illuminate the specific image-forming area onto the original image-forming area of the light modulation element, and a function of converting a resolution of image data to be displayed into a resolution corresponding to the specific image-forming area. In this manner, the screen size of the display image to be displayed on the display surface may be converted into the smaller size of the screen than the original size. For example, when a user watches a program of the television, the user can switch the image display apparatus to display in the small screen size or in the large screen in accordance with the contents programs or the like.

According to a second aspect of the invention, in the image display apparatus disclosed in the first aspect of the invention, the image display apparatus may include a light-shielding unit capable of shielding an area other than the specific image-forming area, wherein the image display-processing unit has a light-shielding control unit controlling the light-shielding unit so as to shield the area other than the specific image-forming area from light at the time of controlling the illumination area modification unit to reduces the illumination area.

Since the area other than the specific image-forming area is sure shielded from light by providing the light-shielding unit, the specific image-forming area may be appropriately formed on the light modulation element. For example, the light-shielding unit using a liquid crystal panel, electrochromic glass, or the like capable of controlling a light transmissivity as 0% or 100% so as to shield the area other than the specific image-forming area from light may be used.

According to a third aspect of the invention, in the image display apparatus disclosed in the first or second aspect of the invention, the image display-processing unit may have a black image-inserting control unit inserting a black-color image onto the area other than the specific image-forming area at the time of controlling the illumination area modification unit to reduce the illumination area.

In this manner, when the black-color image is inserted onto the area other than the specific image-forming area, the specific image-forming area may be appropriately formed on the light modulation element. The insertion of the black-color image and the light-shielding unit disclosed in the second aspect of the invention may be combined, so that the specific image-forming area is formed more appropriately on the light modulation element.

According to a fourth aspect of the invention, in the image display apparatus disclosed in any one of the first to third aspects of the invention, the center of the specific image-forming area may be positioned at or in the vicinity of the center of the image-forming area of the light modulation element.

In the fourth aspect of the invention, even when the small screen size is displayed, the center of the display image of the small screen may be positioned at or in the vicinity of the center of the display surface such as the screen. Consequently, a user can watch programs without a sense of discomfort.

According to a fifth aspect of the invention, in the image display apparatus disclosed in any one of the first to fourth aspects of the invention, the image display apparatus may be a projector equipped with an illumination optical system for having the light source and a projection optical system for projecting light modulated by the light modulation element.

For example, the projector may be a fixed focus type projector used in the projection TV and the like. According to the first to fourth aspects of the invention, the projector disclosed in the fifth aspect of the invention may convert the screen size of the display image displayed on the display surface into the smaller screen size than the original screen size in accordance with programs or the like, by using the projector in the projection TV.

According to a sixth aspect of the invention, in the image display apparatus disclosed in the fifth aspect of the invention, the image display-processing unit may have a function of controlling an output of the light source, and controls the output of the light source at the time of controlling the illumination area modification unit to reduce the illumination area so as to be smaller than that where the illumination area modification unit does not reduce.

When the screen size is configured as the small screen size, the output of the light source may be smaller. In this manner, the light source may be controlled so that the output thereof may be smaller at the time of configuring the screen as the small screen size, thereby suppressing unnecessary power consumption to save energy.

According to a seventh aspect of the invention, in the image display apparatus disclosed in the fifth or sixth aspect of the invention, the position of the specific image-forming area on the image-forming area of the light modulation element may be changeable every predetermined time.

In this manner, by changing the position of the specific image-forming area on the original image-forming area of the light modulation element every the predetermined time, the position of the specific image-forming area is not always the same on the light modulation element. Consequently, some specific area of the light modulation element may be prevented from being more rapidly degraded than other area with time lapsed.

According to an eighth aspect of the invention, in the image display apparatus disclosed in any one of the fifth to seventh aspects of the invention, the change in the position every predetermined time may take place by moving the light modulation element on a plane perpendicular to the optical axis of illumination light entering the light modulation element.

In this manner, by moving the light modulation element on the plane perpendicular to the optical axis of the illumination light entering the light modulation element, the position of the specific image-forming area may be changeable in the original image-forming area of the light modulation element every the predetermined time.

According to a ninth aspect of the invention, in the image display apparatus disclosed in any one of the fifth to seventh aspects of the invention, the change in the position every predetermined time takes place by translating the optical axis of the illumination light outputted from the illumination optical system.

In this manner, even by translating the optical axis of the illumination light outputted from the illumination optical system, the position of the specific image-forming area may be changeable on the original image-forming area every predetermined time.

According to a tenth aspect of the invention, in the image display apparatus disclosed in the ninth aspect of the invention, a movement of the optical axis of the projection optical system may be controlled so that the center of a display image on a display surface is positioned at or in the vicinity of the center of the display surface at the time of translating the optical axis of the illumination light outputted from the illumination optical system.

In this manner, even when the optical axis of the illumination optical system is translated, the center of the display image on the small screen may be positioned at or in the vicinity of the center of the display surface and the like. Consequently, a user can watch programs without a sense of discomfort.

According to an eleventh aspect of the invention, in the image display apparatus disclosed in the fifth to tenth aspects of the invention, the illumination optical system may have a zoom lens, and the illumination area modification unit may reduce the illumination area by changing a zoom ratio of the zoom lens.

In this manner, the illumination optical system may have the zoom lens so as to changing the zoom ratio of the zoom lens, thereby easily switching the illumination area.

According to a twelfth aspect of the invention, in the image display apparatus disclosed in the fifth to eleven aspects of the invention, the projection optical system may be of a fixed focus type.

The invention is effective especially for the fixed focus type projection optical system. That is, the projection optical system used in the fixed focus type projector may just allow a zoom to be adjusted a little or the like in order to alleviate moiré patterns or optical deformation on the display surface such as the screen, and may not switch the screen size in general.

However, even in such a fixed focus type projector, according to the invention, it is possible to change the screen size of the display image being displayed on a display surface such as a screen to a small screen size smaller than the original screen size by the illumination optical system controlling the illumination light.

According to a thirteenth aspect of the invention, in the image display apparatus disclosed in the fifth to twelve aspects of the invention, the image display apparatus may have a display surface for displaying an image projected from the projection optical system thereon.

An example of the image display apparatus being disclosed in any one of the fifth to twelve aspects of the invention and having the display surface may be a projection TV. The projection TV may easily switch the screen size of the display image displayed on the display surface into the smaller screen size than the original size. For example, programs such as sports or movies suitable for the large screen may be watched on the intrinsic large and high-resolution screen of the projection TV, and programs such as news for which the large screen is not necessary may be watched on the small screen.

Alternatively, the image display apparatus disclosed in any one of the fifth to twelve aspects of the invention may be of a front projection type (see FIG. 16) using the fixed focus type projector as well as the projection TV.

According to a fourteenth aspect of the invention, in the image display apparatus disclosed in any one of the first to fourth aspects of the invention, the image display apparatus may be of a direct viewing type, and is provided with the plurality of light sources; and the illumination area modification unit may control turning on and off of only the light source corresponding to the specific image-forming area among the plurality of light sources so that the illumination area modification unit enables the light modulation element to reduce the illumination area.

An example of the image display apparatus disclosed in the fourteenth aspect of the invention is a direct viewing type television with the large screen (for example, a liquid crystal television with the large screen). The direct viewing type television with the large screen may obtain the effect similar to that mentioned in the projection TV disclosed in the thirteenth of the invention.

According to a fifteenth aspect of the invention, in the image display apparatus disclosed in the fourteen aspect of the invention, the position of the specific image-forming area on the image-forming area of the light modulation element may be changeable every predetermined time.

The above-mentioned characteristics are the same as that according to the seventh aspect of the invention. The specific image-forming area may not be always formed on the same position of the light modulation element by allowing the direct viewing type image display apparatus to have the characteristics. Consequently, some specific area of the light modulation element may be prevented from being more rapidly degraded than other area with time lapsed.

According to a sixteenth aspect of the invention, there is an image display control apparatus used in an image display apparatus which has a light source; a light modulation element modulating illumination light coming from the light source on the basis of image data; and an illumination area modification unit that can reduce an illumination area of the light modulation element in order to illuminate a specific image-forming area in the image-forming area of the light modulation element, the image display control apparatus used in the image display apparatus including an image display-processing unit having an illumination area control unit for controlling the illumination area modification unit and a resolution conversion unit for converting a resolution of the image data into a resolution corresponding to the specific image-forming area.

The image display control apparatus used in the image display apparatus may have the image display-processing unit including the functions so as to realize the image display apparatus disclosed in the first aspect of the invention.

The image display control apparatus used in the image display apparatus disclosed in the sixteenth aspect of the invention may have the same characteristics as the image display apparatus disclosed in the second to fifteenth aspects of the invention.

BRIEF DESCRIPTION OF THE DRAWINGS

The invention will be described with reference to the accompanying drawings, wherein like numbers reference like elements.

FIGS. 7A to 7D are diagrams illustrating an example in which the position of a specific image-forming area is changeable on the original image-forming area of the liquid crystal panels 3R, 3G, and 3B every predetermined time.

DESCRIPTION OF EXEMPLARY EMBODIMENTS

Hereinafter, embodiments of the invention will be described. An image display apparatus is embodied as a projector and a projection TV in first to fourth embodiments and the image display apparatus is embodied as a direct viewing type display apparatus (for example, liquid crystal television) in a fifth embodiment.

First Embodiment

Figure 1:
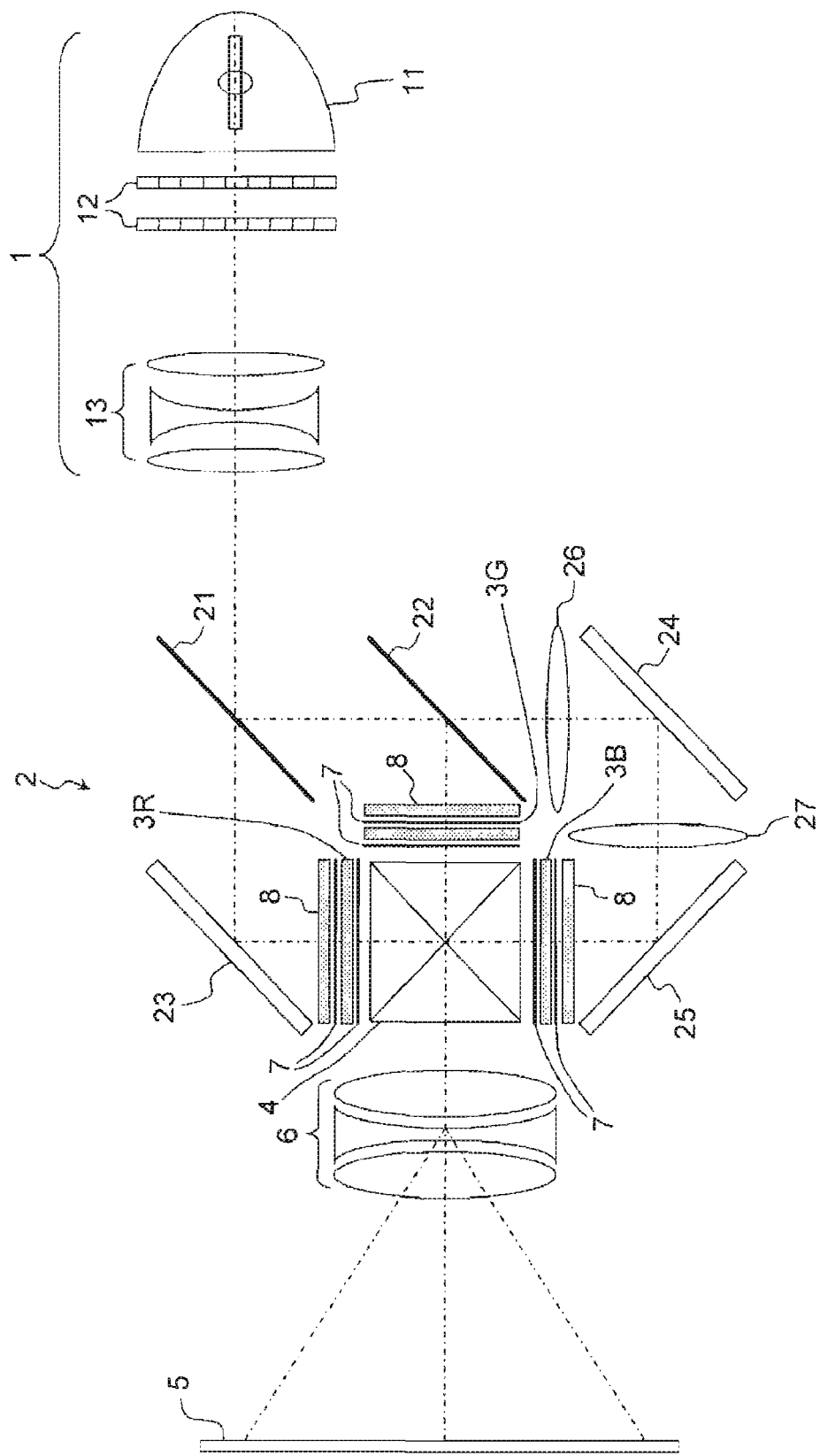
FIG. 1 is a diagram illustrating a configuration of an optical system in a projector according to the first embodiment.

FIG. 1 is a diagram illustrating a configuration of an optical system in a projector according to the first embodiment. The projector according to the first embodiment is a projector using a 3-plate transmission type liquid crystal panel as a light modulation element, and is a fixed focus type projector used in the projection TV.

As shown in FIG. 1, the optical system according to the first embodiment includes an illumination optical system 1; a color-separating optical system 2; liquid crystal panels 3R, 3G, and 3B corresponding to 3-color light of R (red), G (green), and B (blue) in the color-separating optical system 2, a cross dichroic prism 4 synthesizing color light modulated by the liquid crystal panels 3R, 3G, and 3B; and a projection optical system (projection lens 6) projecting the light synthesized by the cross dichroic prism 4 onto a display surface 5.

The illumination optical system 1 includes a light source 11, an integrator lens 12, and a zoom lens 13 which is an illumination area modification unit. A function of the zoom lens 13 will be described below.

Polarization plates 7 are arranged to face each of the liquid crystal panels 3R, 3G, and 3B, and a light-shielding plate 8 which serves as light-shielding unit is arranged at a light-incident side of each polarization plate 7 to face each of the liquid crystal panels 3R, 3G and 3B.

The color-separating optical system 2 includes dichroic mirrors 21 and 22, reflecting mirrors 23, 24, and 25, condensing lenses 26 and 27, and the like.

By changing a zoom ratio, the zoom lens 13 has a function of enabling an illumination area of the liquid crystal panels 3R, 3G, and 3B to be reduced in order to illuminate a specific image-forming area (referred to as a specific image-forming area) of the original image-forming area of the liquid crystal panels 3R, 3G, and 3B. In addition, the projection lens 6 which is of a fixed focus type has only a function of adjusting a zoom a little and the like in order to alleviate moiré patterns or optical deformation on the display surface 5.

Figure 2:
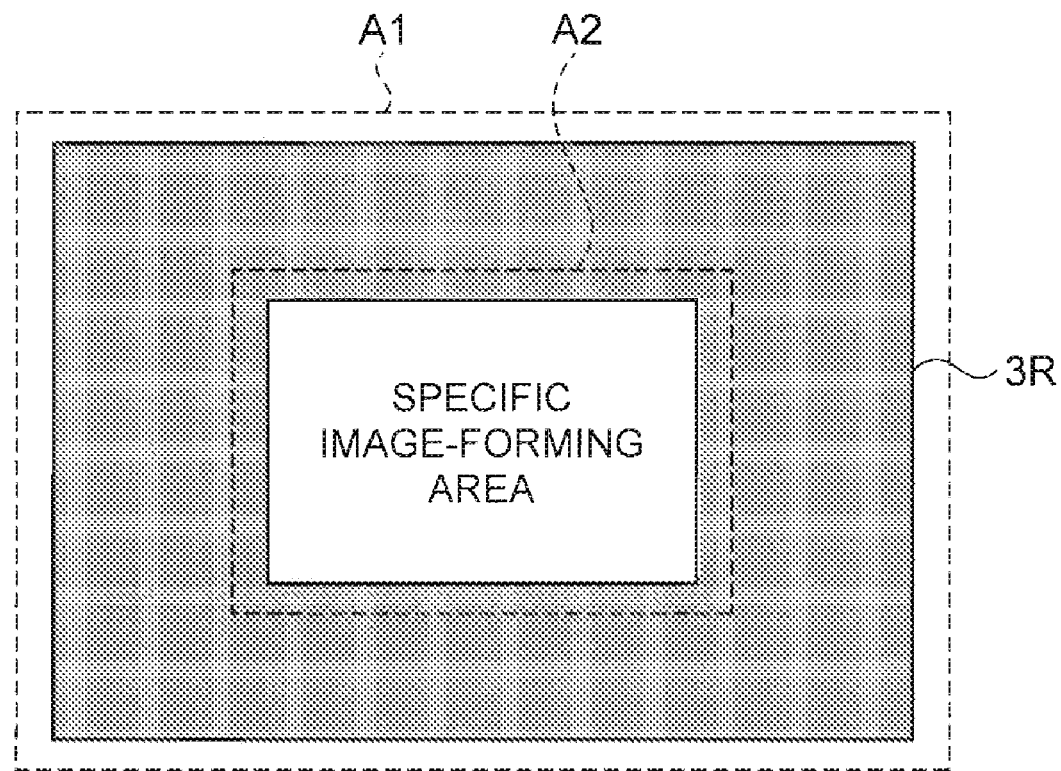
FIG. 2 is diagram showing an example in which an illumination area of liquid crystal panels 3R, 3G, and 3B is reduced.

FIG. 2 is a diagram illustrating an example in which the illumination area of the liquid crystal panels 3R, 3G, and 3B are reduced. FIG. 2 shows the example in which 2 kinds of the illumination area of the original image-forming area of the liquid crystal panel (where the red liquid crystal panel 3R will be describe) can be formed.

An area A1 surrounded by an outer outline indicated by dashed lines is the illumination area (referred to as the illumination area A1) when the entire original image-forming area of the liquid crystal panel 3R is illuminated in FIG. 2. An area surrounded by an inner outline indicated by dashed lines is the illumination area (referred to as an illumination area A2) to illuminate the specific image-forming area (area indicated by white color in FIG. 2). An area indicated by gray color is a light-shielded area by the light-shielding plate 8.

According to the first embodiment of the invention, the illumination area of the liquid crystal panels 3R, 3G, and 3B can be configured to be of 2 types of the area, that is, the illumination area A1 in which the entire original image-forming area of the liquid crystal panels 3R, 3G, and 3B can be illuminated and the illumination area A2 in which the specific image-forming area of the liquid crystal panels 3R, 3G, and 3B can be illuminated.

That is, when the entire original image-forming area of the liquid crystal panels 3R, 3G, and 3B is illuminated, the illumination area A1 including the entire image-forming area of the original liquid crystal panels 3R, 3G, and 3B (where the liquid crystal panel 3R only is represented in FIG. 2) is formed as shown in FIG. 2. In addition, when the specific image-forming area is illuminated, the illumination area A2 having an area capable of including the specific image-forming area is formed.

The illumination area A1 can be switched to the illumination area A2 by controlling a zoom ratio of the zoom lens 13. Further, when the illumination area A2 is formed, the light-shielding plate 8, which is a light-shielding unit, shields an area other than the specific image-forming area from light, so that the light is not illuminated onto the area other than the specific image-forming area.

The light-shielding plate 8, which is the light-shielding unit, can use a mechanical light-shielding unit which shields the area other than the specific image-forming area from light by mechanically moving a non-light transmission plate. Besides the mechanical light-shielding unit, a liquid crystal panel, an electro-chromic glass, or the like in which light transmissivity can be converted to nearly 0% and 100% can be used. In addition, a black-color image can be inserted onto the area other than the specific image-forming area. The insertion of the black-color image and the light-shielding plate 8 are combined in each embodiment of the invention.

Figure 3:
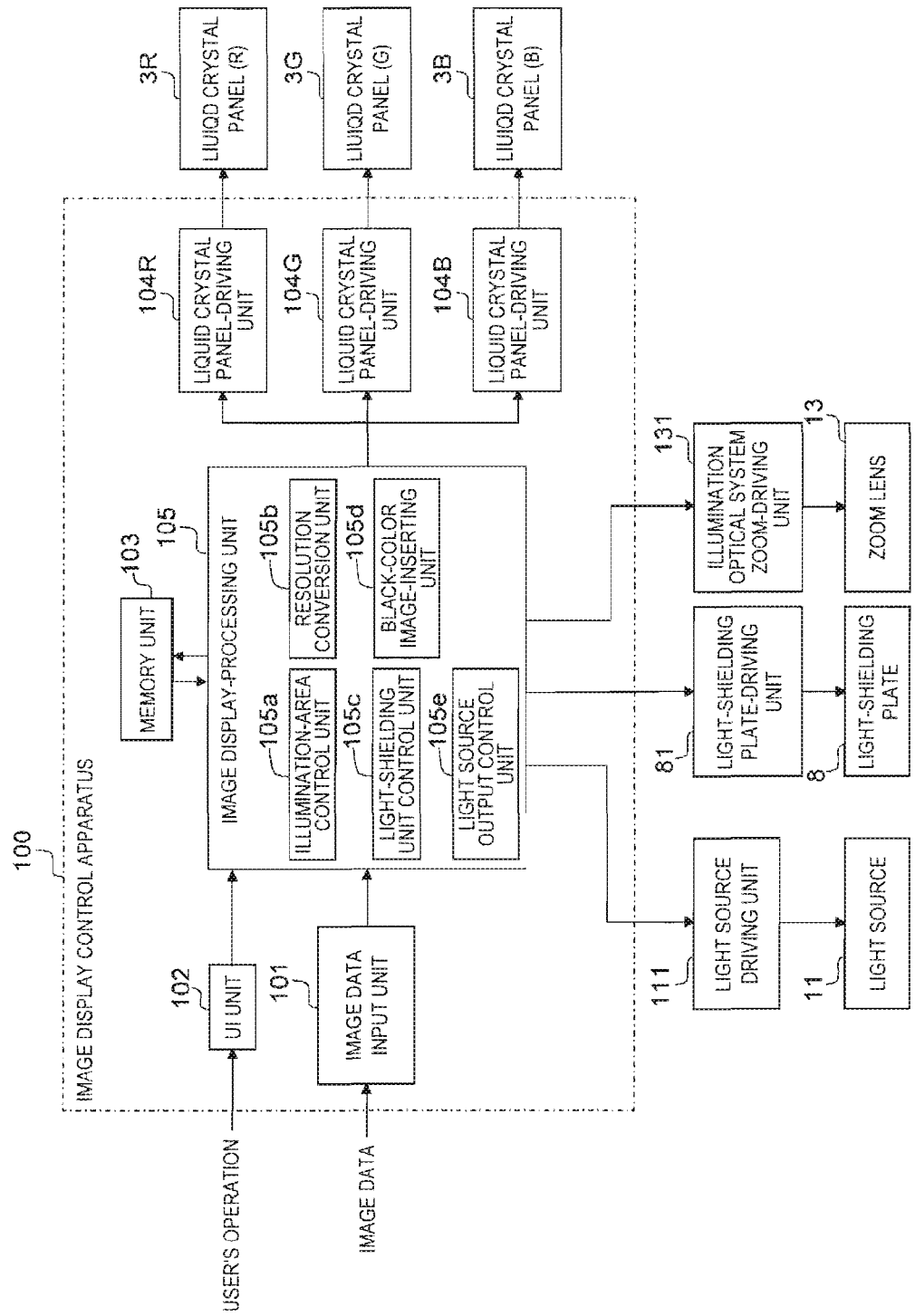
FIG. 3 is a diagram illustrating a configuration of the image display control apparatus of the projector according to the first embodiment.

FIG. 3 is a diagram illustrating a configuration of the image display control apparatus of the projector according to the first embodiment. According to the first embodiment, the image display control apparatus 100 of the projector includes an image input unit 101 for inputting image data to be displayed; a user interface (UI) unit 102 for performing every kind of setting such as the display size of the display surface 5; a memory unit 103 for storing every kind of data required for the image display control apparatus 100 according to the embodiment of the invention to perform processes; liquid crystal panel-driving units 104R, 104G, and 104B for driving the liquid crystal panels 3R, 3G, and 3B; and an image display-processing unit 105 for processing every kind of process required to display an image.

The image display-processing unit 105 includes an illumination area control unit 105a for controlling an illumination optical system zoom-driving unit 131 so as to reduce the illumination area and to return the reduced illumination area to the original illumination area; a resolution conversion unit 105b for converting a resolution of the image data which the image data input unit 101 inputs; a light-shielding unit control unit 105c for controlling a light-shielding plate-driving unit 81 so as to shield the area other than the specific image-forming area from light and cancel the light shielding operation; a black-color image-inserting control unit 105d for inserting the black-color image onto the area other than the specific image-forming area; and a light source output control unit 105e for controlling a light source driving unit 111 so as to vary the output of a light source 11.

In addition, the image display-processing unit 105 also has a function of processing every kind of compensation such as color compensation, a function of performing processes in accordance with user's settings through the user interface unit 102, and other functions.

Figure 4:
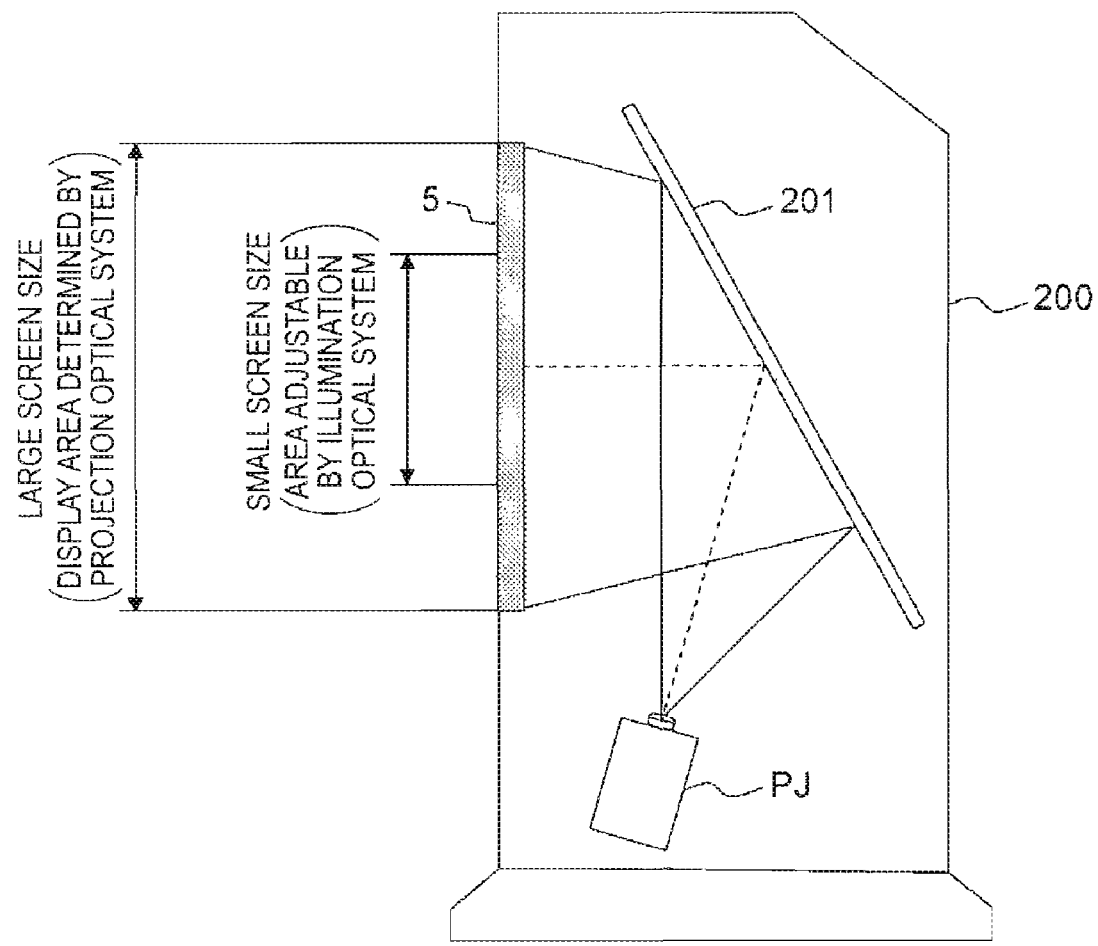
FIG. 4 is a diagram illustrating an overview configuration of a projection TV.

FIG. 4 is a diagram illustrating an overview configuration of a projection TV. The projection TV shown in FIG. 4 includes the display surface 5 provided in the front of a housing 200; the projector PJ for projecting an image from the rear of the display surface 5; a reflecting mirror 201 for reflecting the image projected from the projector PJ onto the display surface 5; and the like.

According to the first embodiment, the projector PJ used in the projection TV shown in FIG. 4 has the optical system shown in FIG. 1. In addition, the image display control apparatus of the projector PJ has the configuration of the image display control apparatus 100 shown in FIG. 3. The image display control apparatus 100 can be mounted in the projection PJ and also mounted in the housing 200 of the projection TV separately from the projection PJ.

An example in which a screen size of such a configured projection TV is switched in accordance with the programs and the like will be described. In the projection TV shown in FIG. 4, the screen size can be switched between two screen sizes, i.e., an original screen size (referred to as a large screen size) of the projection TV and a small screen size (referred to as a small screen size) smaller than the original screen size.

In the first embodiment, when programs such as sports or movies suitable for the large screen size are watched, the large screen originally configured in the projection TV is used to be displayed. Conversely, when programs such as news in which the large screen is not required are watched, the small screen size is configured.

The size of the screen can be configured through the user interface unit 102. For example, selection buttons "large screen" and "small screen" can be provided in the user interface unit and a user can select one of the buttons. Alternatively, when the large screen is configured as default and a button "screen switch" is provided, the large screen can be switched to the small screen by pressing the button "screen switch" and the small screen returns to the large screen by pressing the button "screen switch" again, or returns automatically by turning off the switch, or the like.

When a user configures the small screen size in order to switch the screen into the small screen size, based on the configuration of the small screen size by the user, the image display-processing unit 105 performs a resolution-modifying process, a color compensation process, or the like required to display the image. In addition, it inserts the black-color image so that the image data in which every kind of the processes is performed are transmitted to the liquid crystal panel-driving units 104R, 104G, and 104B.

In the resolution-modifying process, the resolution of the image data to be displayed is switched into the resolution corresponding to the specific image-forming area of the liquid crystal panels 3R, 3G, and 3B. Specifically, if the large screen size is about 50 inches and the resolution is, for example, 1920 pixels×1080 pixels, the large screen size can be switched into a small screen size (about 25 inches) having a resolution of 854 pixels×480 pixels, for example, with the assumption that the aspect ratio is not changed.

The image display-processing unit 105 controls the illumination optical system zoom-driving unit 131, the light-shielding plate-driving unit 81, and the light source driving unit 111. The zoom lens 13 performs a zoom operation as much as a predetermined zoom ratio, so that the illumination area of the liquid crystal panels 3R, 3G, and 3B can be reduced. For example, the illumination area A2 shown in FIG. 2 is formed. In addition, the light-shielding plate 8 shields the area indicated by the gray-color from light in FIG. 2, so that the specific image-forming area is formed. In addition, the light source driving unit 111 reduces the output, that is, an amount of light of the light source 11.

In such a configuration, when the image is projected, the screen size (for example, 25 inches) which is smaller than the original screen size (for example, 50 inches) of the projection TV is displayed on the display surface 5. At this time, the light source 11 is controlled so that the output is smaller at the time of displaying the small screen than at the time of displaying the large screen. Accordingly, it is possible, to reduce the power consumption.

Conversely, when the original large screen of the projection TV is displayed, the illumination area A1 shown in FIG. 2 is formed on the liquid crystal panels 3R, 3G, and 3B and the original screen (the large screen) of the projection TV is displayed on the display surface 5, for example, by configuring the screen as the large screen size by a user.

As described above, the projection JP used in the projection TV has the configuration shown in FIGS. 1 and 3, so that a user can configure the screen as any one of the large screen size and the small screen size in accordance with the contents of programs. For example, when the user configures the screen as the small screen size, the illumination light, coming from the light source 11 is irradiated only on the specific image-forming area of each liquid crystal panel 3R, 3G, and 3B, by driving the zoom lens 13 provided in the illumination optical system 1 and driving the light-shielding plate 8.

There are many programs which are not required to be watched on the large screen of the projection TV or the like. Consequently, it is not always necessary for the large screen to be displayed. A user who uses the projection TV can configure the screen as any one of the large screen size and the small screen size at his disposal, thereby suppressing unnecessary power consumption and thus saving energy.

In addition, when an image display apparatus which is of a low-power consumption type is used at the time of watching a movie, it is required that the lighting of the room is dark. When programs such as news are watched, the image display apparatus makes the screen size smaller, so that it is not required that the lighting of the room is dark in spite of the same power consumption.

Second Embodiment

A projector according to a second embodiment enables the position of a specific image-forming area on an original image-forming area of liquid crystal panels 3R, 3G, and 3B to be changed every predetermined time at the time of illuminating the specific image-forming area onto the original image-forming area of the liquid crystal panels 3R, 3G, and 3B.

That is, when the screen is configured as a small screen size, only the specific image-forming area is illuminated not the entire original image-forming area of each liquid crystal panel 3R, 3G, and 3B. When the specific image-forming area to be illuminated is always the same position in this manner, degradation of each liquid crystal panel 3R, 3G, and 3B and a deflection plate 7 is not uniform with time lapsed. Consequently, a specific area of the original image-forming area of the liquid crystal panels 3R, 3G, and 3B and the specific area of the deflection plate corresponding to the area can be more rapidly degraded than other area with time lapsed. The projector according to the second embodiment is contrived to prevent the drawback.

Figure 5:
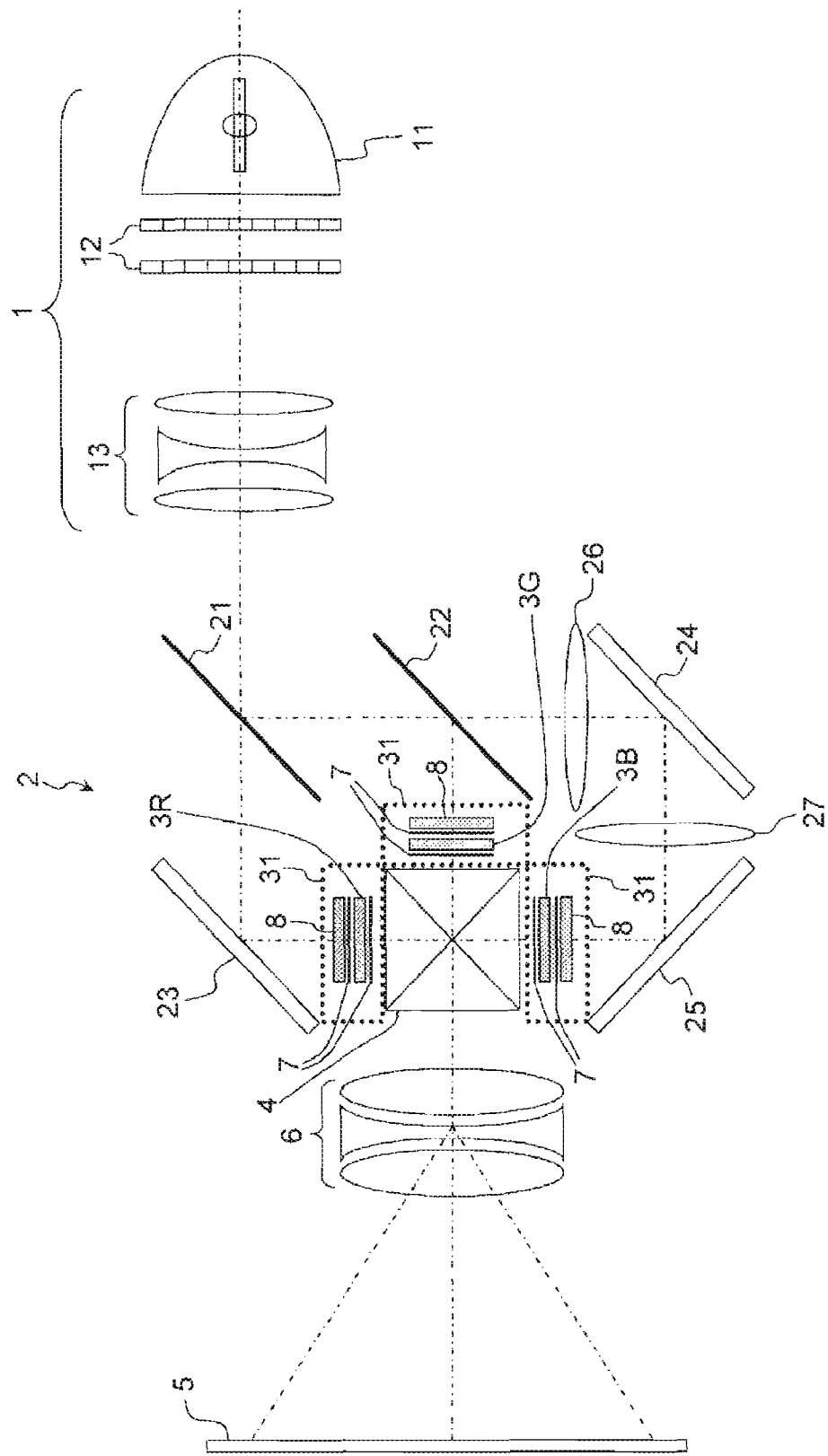
FIG. 5 is a diagram illustrating a configuration of an optical system according to a second embodiment.

FIG. 5 is a diagram illustrating a configuration of a projector of an optical system according to the second embodiment. The optical system of the projector according to the second embodiment includes a liquid crystal panel-moving machine unit 31 capable of moving each liquid crystal panel 3R, 3G, and 3B, the deflection plate 7, and a light-shielding plate 8 in an integrated manner as much as a predetermined amount on a plane perpendicular to the optical axis of illumination light inputted into each liquid crystal panel 3R, 3G, and 3B, which is different from that according to the first embodiment. Other configuration elements are the same as those shown in FIG. 1 and the same reference numerals are used.

When each liquid crystal panel 3R, 3G, and 3B is moved, the deflection plate 7 and the light-shielding plate 8 corresponding to the each liquid crystal panel 3R, 3G, and 3B are also moved in the integrated manner. Hereinafter, the movement of each liquid crystal panel 3R, 3G, and 3B, the deflection plate 7, and the light-shielding plate 8 is referred to as the movement of the liquid crystal panels 3R, 3G, and 3B.

Figure 6:
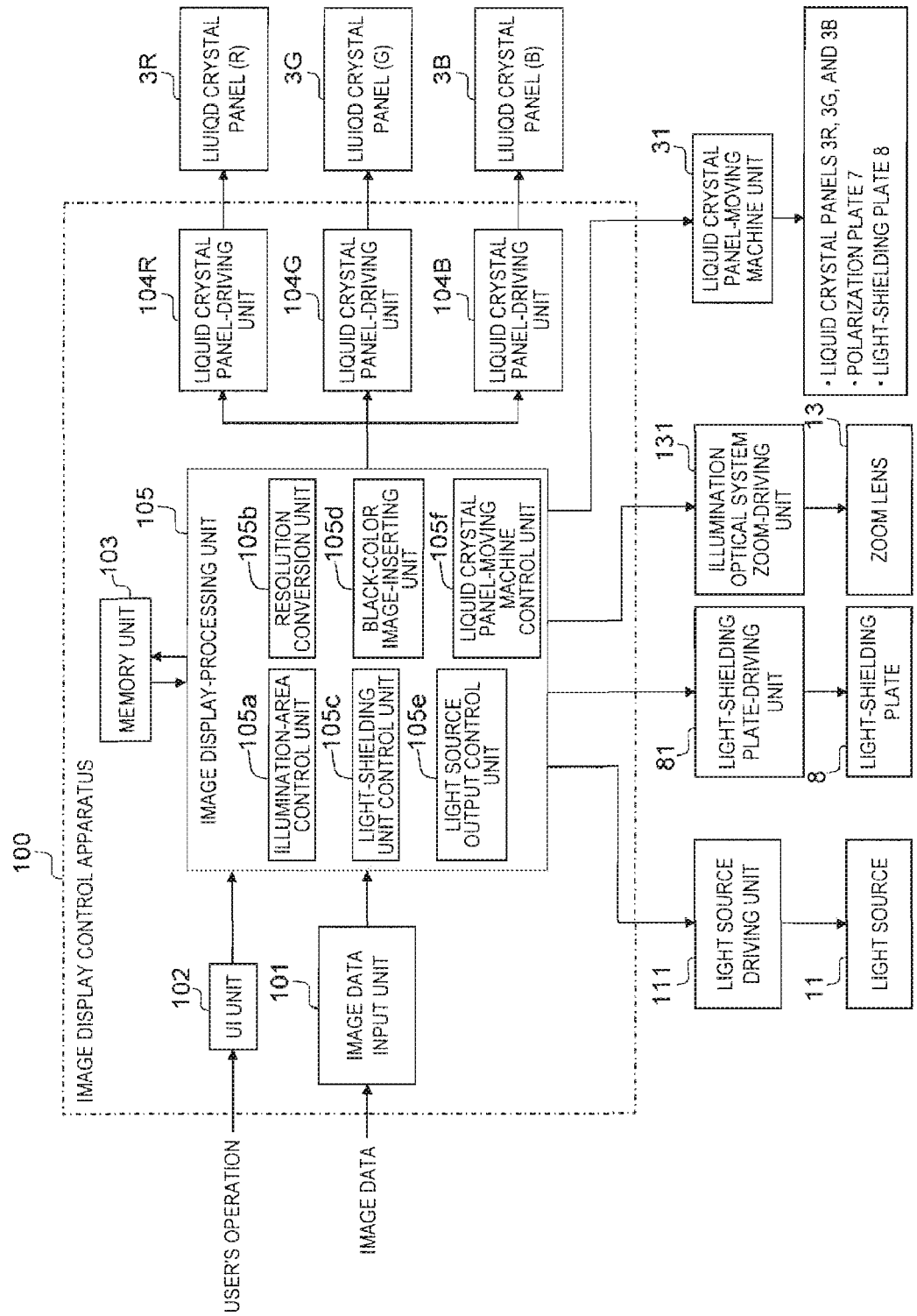
FIG. 6 is a diagram illustrating a configuration of the image display control apparatus used in the projector according to the second embodiment.

FIG. 6 is a diagram illustrating a configuration of the image display control apparatus used in the projector according to the second embodiment. The image display-processing unit 105 of the image display control apparatus 100 used in the projector according to the second embodiment includes a liquid crystal panel-moving machine control unit 105f for controlling the liquid panel-moving machine unit 31, which is different from the image display control apparatus according to the first embodiment. Other configuration elements are the same as those shown in FIG. 3 and the same reference numerals are used.

Since each liquid crystal panel 3R, 3G, and 3B moves on the 2-dimensional plane as much as the predetermined amount in the projector according to the second embodiment, the size of the cross dichroic prism 4 is determined in consideration of the movement of each liquid crystal panel 3R, 3G, and 3B.

The liquid crystal panel-moving machine unit 31 can control the movement of each liquid crystal panel 3R, 3G, and 3B, for example, by moving each liquid crystal panel 3R, 3G, and 3B by a stepping motor and the like.

FIGS. 7A to 7D are diagrams illustrating an example in which the position of the specific image-forming area is changed on the original image-forming area of the liquid crystal panels 3R, 3G, and 3B every predetermined time. In FIGS. 7A to 7D, the liquid crystal panel 3R will be described as one example, but the position of the illumination area can be changed on the area of the liquid crystal panels 3G and 3B in the same manner.

FIG. 7A shows that the liquid crystal panel 3R is moved so that the specific image-forming area is formed on the right lower portion among 4 portions into which original image-forming area of the liquid crystal panel 3R are divided. FIG. 7B shows that the liquid crystal panel 3R is moved so that the specific image-forming area is formed on the right upper-portion among 4 portions into which original image-forming area of the liquid crystal panel 3R are divided.

FIG. 7C shows that the liquid crystal panel 3R is moved so that the specific image-forming area is formed on the left upper portion among 4 portions into which original image-forming area of the liquid crystal panel 3R are divided. FIG. 7D shows that the liquid crystal panel 3R is moved so that the specific image-forming area is formed on the left lower portion among 4 portions into which original image-forming area of the liquid crystal panel 3R are divided.

An outline indicated by the dashed lines including each specific image-forming area shown in FIGS. 7A to 7D refers to the illumination area A2 of each specific image-forming area. A gray area is an area in which light is shielded by the light-shielding plate 8. In this case, the black-color image is inserted into the area in which light is shielded in the same manner according to the first embodiment.

When each specific image-forming area is controlled to be moved on the original image-forming area of each liquid crystal panel 3R, 3G, and 3B shown in FIGS. 7A to 7D, and each specific, image-forming area is positioned at each portion shown in FIGS. 7A to 7D, each liquid crystal panel 3R, 3G, and 3B is controlled to be moved so that the center of each specific image-forming area in each portion accords with the optical axis.

Accordingly, even when the specific image-forming area is configured to be positioned in any portion of the image-forming area of the liquid crystal panels 3R, 3G, and 3B shown in FIGS. 7A to 7D, the center of the display image of the small screen is the center of the display surface 5 at the state that the optical axis of the projection lens 6 is configured at the center of the display surface 5.

In this manner, even when the display image is displayed on the small screen, a user does not feel a sense of discomfort. That is because the display image is positioned at the center of the display surface 5. To the extent that the user does not feel the sense of discomfort, the center of the display image on the small screen may not completely accord with the center of the display surface 5.

As shown in FIGS. 7A to 7D, the liquid crystal panel-moving machine unit 31 controls the movement of the liquid crystal panels 3R, 3G, and 3B on the basis of control signals coming from the image display-processing unit 105. Specifically, when a user configures the screen as the small screen through the user interface unit 102, the liquid crystal panel-moving machine unit 31 controls the movement of each liquid crystal panel 3R, 3G, and 3B in accordance with the control signal coming from the image display-processing unit 105.

The movement of each liquid crystal panel 3R, 3G, and 3B can be controlled at some regular time, at the time of switching the display image (at time of switching a program to a commercial and the like), at the time of turning on a switch, or the like. For example, suppose that a program is displayed on the specific image-forming area shown in FIG. 7A. When the program is switched to a commercial, the liquid crystal panels 3R, 3G, and 3B are moved in a down direction so that the specific image-forming area is switched onto the position shown in FIG. 7B.

In this manner, since the projector according to the second embodiment controls the movement of the specific image-forming area on the original image-forming area of the liquid crystal panels 3R, 3G, and 3B every predetermined time at the time of displaying the small screen, the specific image-forming area is not always formed on the same position of the liquid crystal panels 3R, 3G, and 3B.

The projector according to the second embodiment can prevent one specific area of the liquid crystal panels 3R, 3G, and 3B from being degraded more rapidly than the other specific areas, besides the effect obtained from the projector according to the first embodiment.

The projection TV shown in FIG. 4 can be also configured by using the projector according to the second embodiment. That is, by allowing the projector PJ used in the projection TV to have the configuration shown in FIGS. 5 and 6, a user can configure the screen as any one of the large screen size and the small screen size in accordance with programs.

Third Embodiment

As described above, the projector according to the second embodiment can prevent only a specific area of the liquid crystal panels 3R, 3G, and 3B from being degraded more rapidly than the other specific areas by controlling the movement of each liquid crystal panel 3R, 3G, and 3B. However, a projector according to a third embodiment can obtain the same effect by translating in parallel the optical axis of a zoom lens 13 in the illumination optical system 1.

In addition, when the optical axis of the zoom lens 13 of the illumination optical system 1 is translated in the projector according to the third embodiment, the center of the display of the small screen on the display surface 5 is corrected by translating the optical axis of the projection lens 6.

Figure 8:
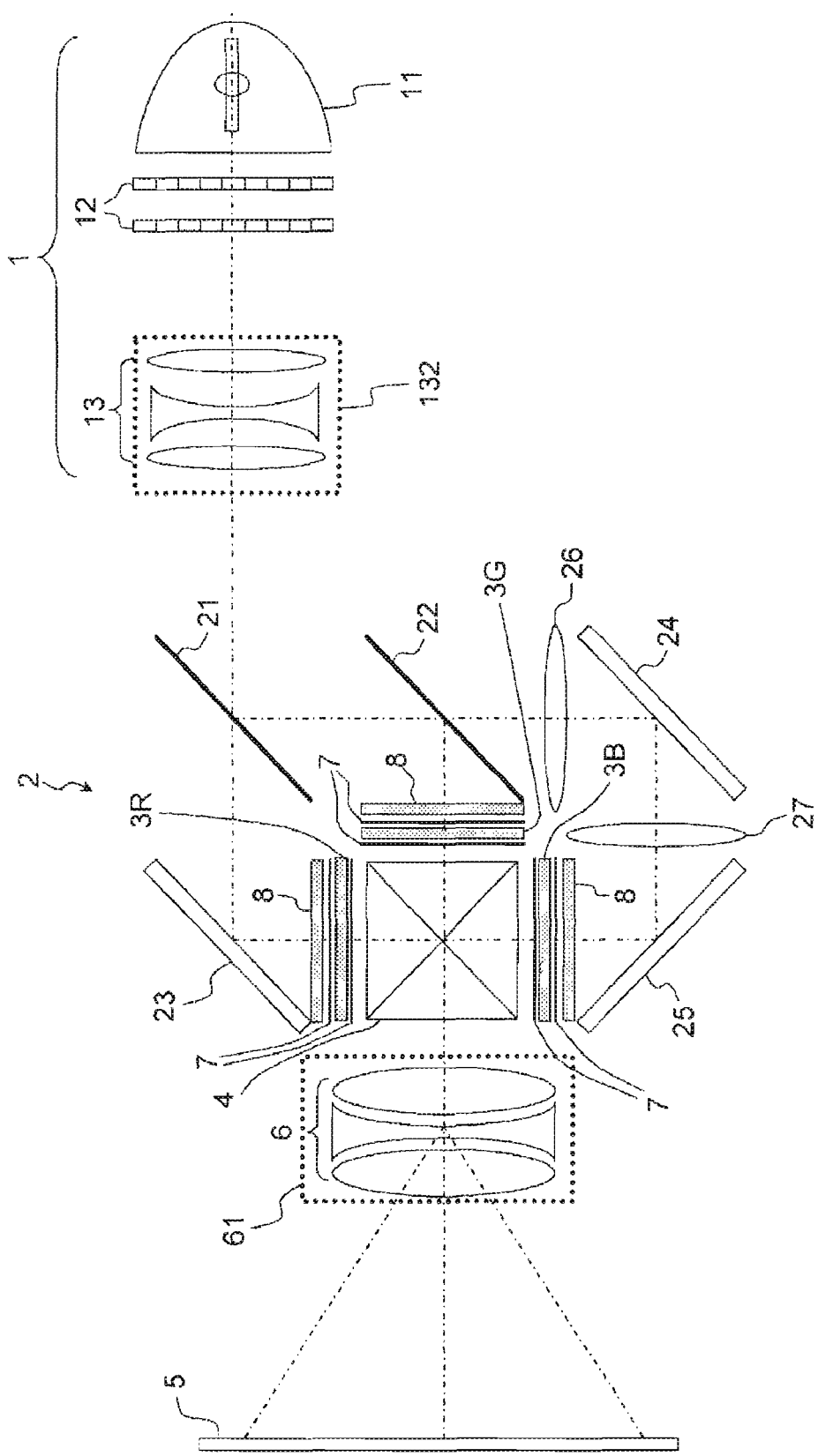
FIG. 8 is a diagram illustrating a configuration of the optical system used in a projector according to a third embodiment.

FIG. 8 is a diagram illustrating a configuration of the optical system of the projector according to the third embodiment. The optical system of the projector according to the third embodiment includes an illumination optical system-optical axis-moving machine unit 132 capable of translating the optical axis of the zoom lens 13 of the illumination optical system 1 as much as a predetermined amount by the means of a lens shift function and the like; and an projection optical system-optical axis-moving machine unit 61 capable of translating the optical axis of the projection lens 6 of the projection optical system as much as a predetermined amount by the means of the lens shift function and the like. Other configuration elements are the same as those shown in FIG. 1 and the same reference numerals are used.

Figure 9:
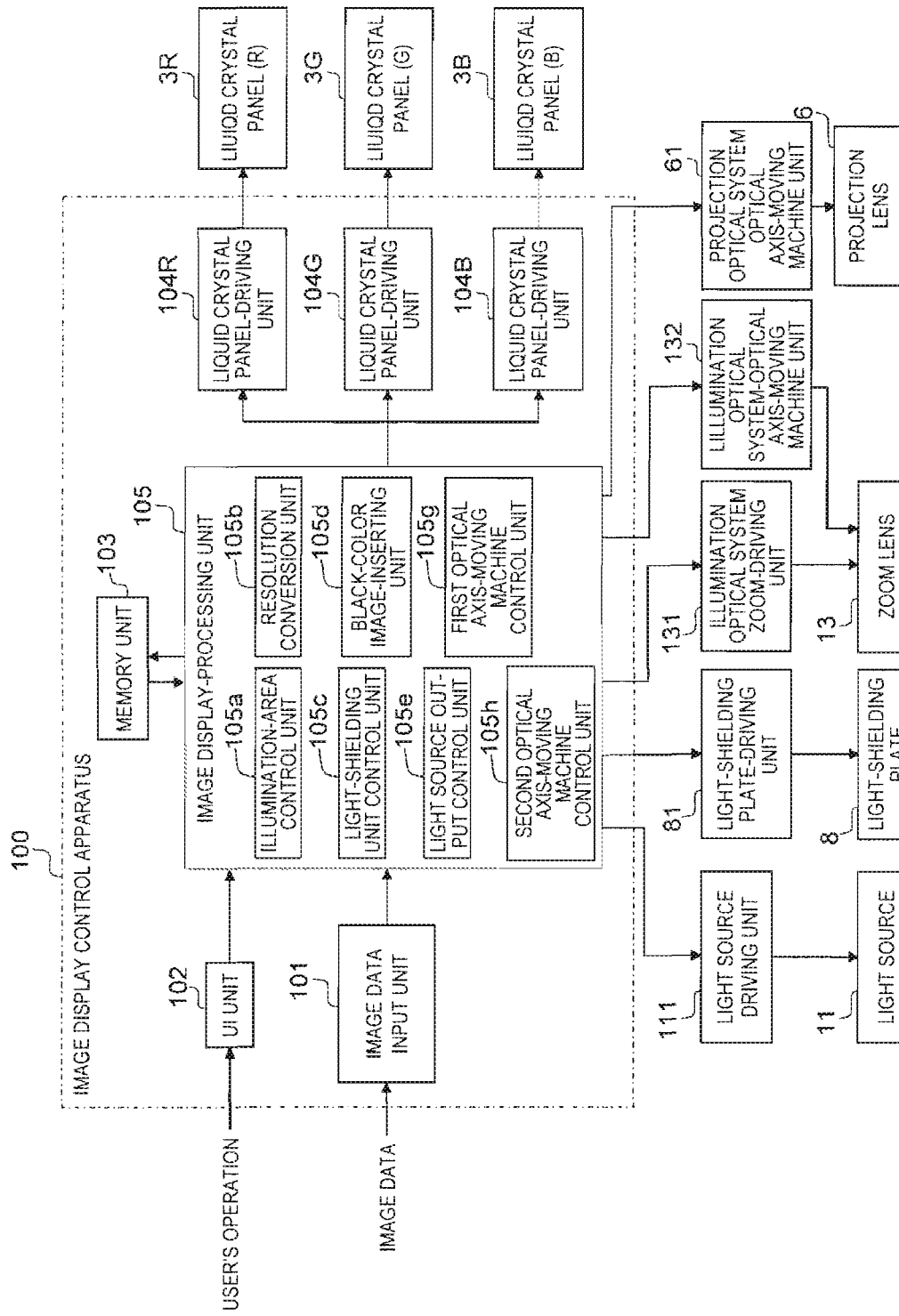
FIG. 9 is a diagram illustrating a configuration of an image display control apparatus used in the projector according to the third embodiment.

FIG. 9 is a diagram illustrating a configuration of the image display control apparatus used in the projector according to the third embodiment. The image display-processing unit 105 of the image display control apparatus 100 used in the projector according to the third embodiment includes a first optical axis-moving machine control unit 105g for controlling the illumination optical system-optical axis-moving machine unit 132 and a second optical axis-moving machine control unit 105h for controlling the projection optical system-optical axis-moving machine unit 61. Other configuration elements are the same as those shown in FIG. 3 and the same reference numerals are used.

The optical axis of the zoom lens 13 and the projection lens 6 can be translated in parallel by means of the lens shift function generally used in a projector. A function of translating the optical axis of the projection lens 6 in the upper or lower direction is the lens shift function of the projector in general.

The lens shift function generally used in the projector is applied to the third embodiment. By controlling the movement of the optical axis of the zoom lens 13 and the projection lens 6 in the upper or lower direction, the position of the specific image-forming area formed on the liquid crystal panels 3R, 3G, and 3B is changeable on the original image-forming area of the liquid crystal panels 3R, 3G, and 3B.

Figure 10:
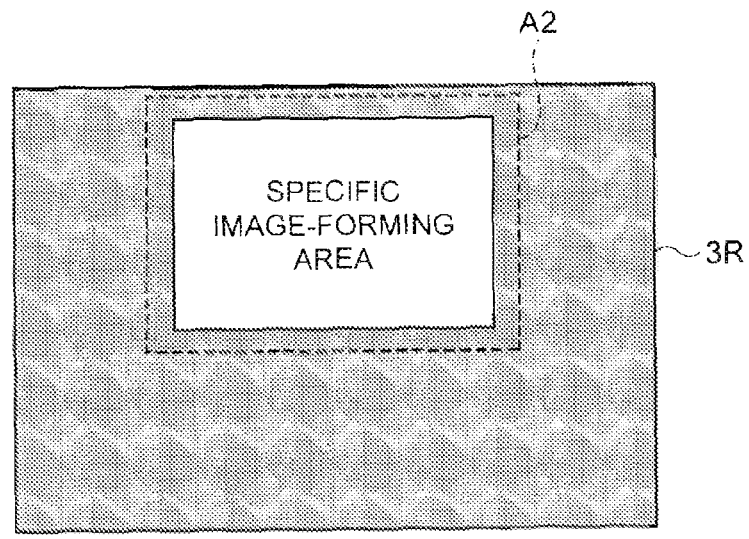
FIG. 10 is a diagram illustrating an example in which the position of the specific image-forming area is changed on each liquid crystal panels 3R, 3G, and 3B by performing a control in which the optical axis of a zoom lens 13 is translated in parallel in an upper direction by an arbitrary amount.

By controlling the parallel translation of the optical axis of the zoom lens 13 in the upper direction as much as the predetermined amount, the specific, image-forming area of each liquid crystal panel 3R, 3G, and 3B is changeable as shown in FIG. 10. In FIG. 10, an outline indicated by dashed lines including the specific image-forming area refers to an illumination area A2 of the specific image-forming area and an area indicated by gray color represents the area shielded from light by the light-shielding plate 8. In this case, the black-color image is inserted onto the area in which light has to be shielded as described above.

When the optical axis of the zoom lens 13 is translated, the center of the small screen on the display surface 5 is shifted. Consequently, in order to correct the shift, the optical axis of the projection lens 6 is made translated by means of the lens shift function as much as the predetermined amount. In this manner, even when the parallel movement of the optical axis of the zoom lens 13 and the projection lens 6 results in the change in the position of the specific image-forming area on the liquid crystal panels 3R, 3G, and 3B, the position of the display image is made unchangeable on the display surface 5.

Like the projector according to the second embodiment, the movement of the zoom lens 13 and the projection lens 6 used in the projector according to the third embodiment can be controlled at every regular time, at the time of switching an image (at time of switching some program to some commercial and the like), at the time of turning on a switch, or the like.

It is described that the illumination area of the liquid crystal panels 3R, 3G, and 3B is changeable in the upper or lower direction by using the lens shift, function generally used in the projector in the above-mentioned example. However, an apparatus for moving the optical axis of the zoom lens 13 and the projection lens 6 in the upper, lower, right, or left direction can be also provided, so that the specific image-forming area is changeable on the liquid crystal panels 3R, 3G, and 3B as shown in FIGS. 7A to 7D.

As describe above, the specific image-forming area to be illuminated is moved on the image-forming area of the liquid crystal panels 3R, 3G, and 3B at the time of displaying the small screen in the projector according to the third embodiment as the same as that according to the second embodiment. Consequently, the problem that only one area of the image-forming area of the liquid crystal panels 3R, 3G, and 3B is degraded more rapidly than the other areas with time lapsed can be prevented.

The projector according to the third embodiment can also have the configuration of the projection TV shown in FIG. 4. That is, the projector PJ used in the projection TV has the configuration shown in FIGS. 8 and 9, so that a user can configure the screen as any one of the small screen size and the large screen in accordance with programs.

Fourth Embodiment

Figure 11:
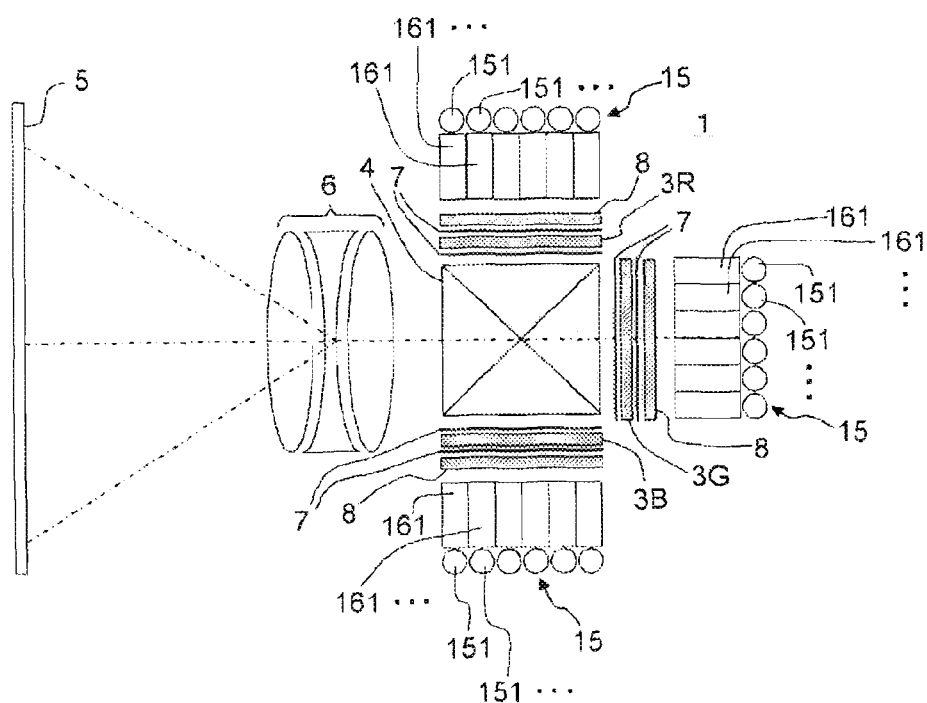
FIG. 11 is a diagram illustrating a configuration of the optical system used in a projector according to a fourth embodiment.

FIG. 11 is a diagram illustrating a configuration of the optical system used in a projector according to a fourth embodiment. The optical system used in the projector according to the fourth embodiment includes an LED array 15 with a plurality of LEDs 151 and a plurality of rod integrators 161 each corresponding to the LEDs 151 constituting the LED array 15, which is different from the projectors according to the first to third embodiments. In FIG. 11, the configuration elements to which the same reference numerals as those used in the projector (FIG. 1) according to the first to third embodiments are assigned are the same configuration elements as those shown in FIG. 1.

The LED array 15 includes the plurality of LEDs 151 arranged in the matrix shape. The plurality of rod integrators 161 are disposed between the LEDs 151 and each liquid crystal panel 3R, 3G, and 3B so as to lead illumination light coming from the respective LED 151 to the corresponding liquid crystal panel 3R, 3G, and 3B.

Figure 12:
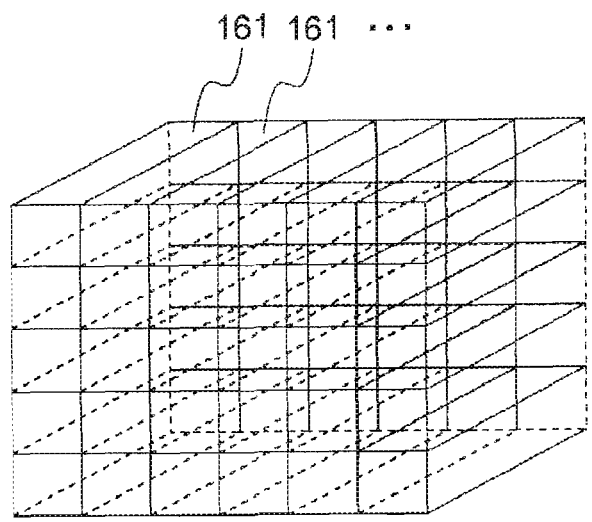
FIG. 12 is a diagram illustrating an arrangement of rod integrators corresponding to any one of the liquid crystal panels 3R, 3G, and 3B of the projector shown in FIG. 11.

FIG. 12 is a diagram illustrating an arrangement of the rod integrators 161 corresponding to any one of the liquid crystal panels 3R, 3G, and 3B of the projector shown in FIG. 11. As shown in FIG. 12, the plurality of integrators 161 are arranged in the matrix shape.

The illumination area control unit 105a of the image display-processing unit 105 in the image display control apparatus 100 (see FIG. 1) controls the light source driving unit 111, so that the respective LED 151 of the LED array 15 turns on or off.

For example, when the specific image-forming area shown in FIG. 2 is configured, the illumination area control unit 105a drives the light source driving unit 111 so as to form the illumination area A2 in order to illuminate the specific image-forming area. That is, the illumination area control unit 105a controls the light source driving unit 111, so that only LEDs necessary to illuminate the illumination area A2 among the LEDs 151 of the LED array 15 with the matrix shape turn on.

In addition, when the entire original image-forming area of each liquid crystal panel 3R, 3G, and 3B is illuminated, the illumination area control unit 105a controls the light source driving 11, so that all the LEDs of the LED array 15 turn on.

In this manner, the projector according to the fourth embodiment has the function in which the LED array 15 and the light source driving unit 111 serve as illumination area-modification unit.

As shown in FIGS. 7A to 7D, the projector according to the fourth embodiment can modify the positions of the specific image-forming areas on the original image-forming area of the liquid crystal panels 3R, 3G, and 3B every predetermined time.

When the projector according to the fourth embodiment modifies the positions of the specific image-forming areas shown in FIGS. 7A to 7D, the illumination area control unit 105*a* controls the light, source driving unit 111, so that the only LEDs necessary to illuminate a predetermined area turn on. That is, the light source driving unit 111 is controlled, so that the specific image-forming area is formed on the position shown in FIG. 7A at some time, and the light source driving unit 111 is controlled, so that the specific image-forming area is formed on the position shown in FIG. 7B at some time. In this manner, the position of the specific image-forming area is changeable every predetermined time as shown in FIGS. 7A to 7D.

When the position of the specific image-forming area is changed on the liquid crystal panels 3R, 3G, and 3B, the position of the display image cannot be changed on the display surface 5 by translating the optical axis of the projection lens 6 as much as a predetermined amount.

Like the projector according to the first to third embodiments, it is desirable that the light-shielding plate 8 shields the area other than the specific image-forming area from light as well as inserting the black-color image onto the area other than the specific image-forming area at the time of configuring the specific image-forming area, so that light is not irradiated onto the area other than the specific image-forming area.

Like the projector according to the first embodiment described above, the specific image-forming area can be configured in the projector according to the fourth embodiment as described above. Consequently, the projection TV shown in FIG. 4 can be also realized by using the projector according to the fourth embodiment.

The light-shielding plate 8 is installed in the illumination optical system 1 of the liquid crystal panels 3R, 3G, and 3B according to the first to fourth embodiments as described above. However, it is possible to install the light-shielding plate 8 in the projection lens 6.

The transmission type liquid crystal panel is exemplified in the first to fourth embodiments, but the reflection type liquid crystal panel can be also adopted. The 3-plate liquid crystal panel is exemplified in the first to fourth embodiments, but the mono-plate liquid crystal panel can be also adopted. In addition, the digital micromirror device and the like can be used as the light modulation element.

Figure 16:
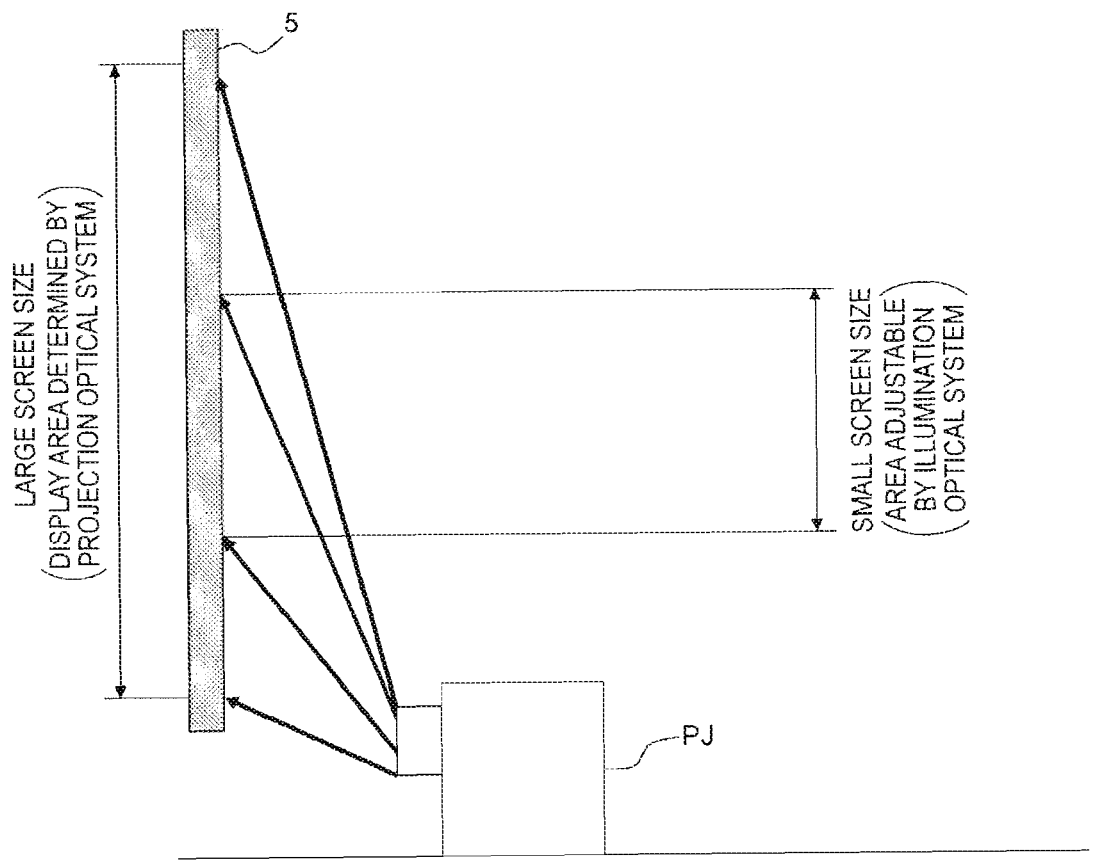
FIG. 16 is a diagram of an example in which the overview front projection type image display apparatus using the fixed focus type projector is represented.

The invention is applicable to the fixed focus type front projection type image display apparatus and a projector used in the image display apparatus. FIG. 16 is a diagram of an example in which the overview front projection type image display apparatus using the fixed focus type projector is represented. It is possible to display the small screen on the display surface 5 even in the front projection type image display apparatus.

Fifth Embodiment

Figure 13:
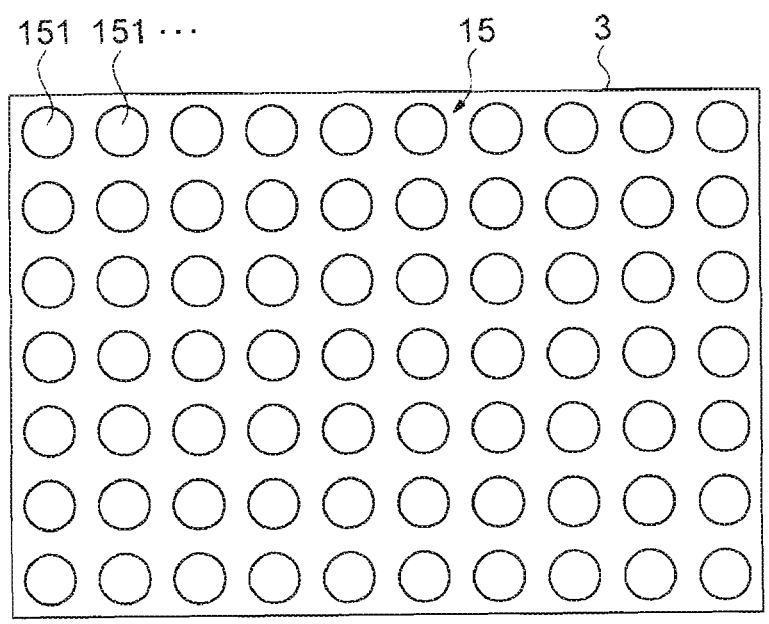
FIG. 13 is a diagram illustrating a configuration of the liquid crystal panel and the light source of the direct viewing type image display apparatus according to a fifth embodiment.

FIG. 13 is a schematic diagram illustrating a configuration of the liquid crystal panel and the light source of the direct viewing type image display apparatus according to a fifth embodiment. FIG. 13 is a diagram illustrating a corresponding relation between the liquid crystal panel 3 and the LED array 15 which is the light source. Other configuration elements such a polarization plate and a color filter are omitted.

As shown in FIG. 13, the LED array 15 is provided on an irradiation surface of the illumination light in the liquid crystal panel 3. The plurality of LEDs 151 in the LED array 15 are arranged in the matrix shape.

As not shown in FIG. 13, the rod integrators and the like can be provided between the LED array 15 and the liquid crystal panel 3 in order to more appropriately configure the specific image-forming area.

Figure 14:
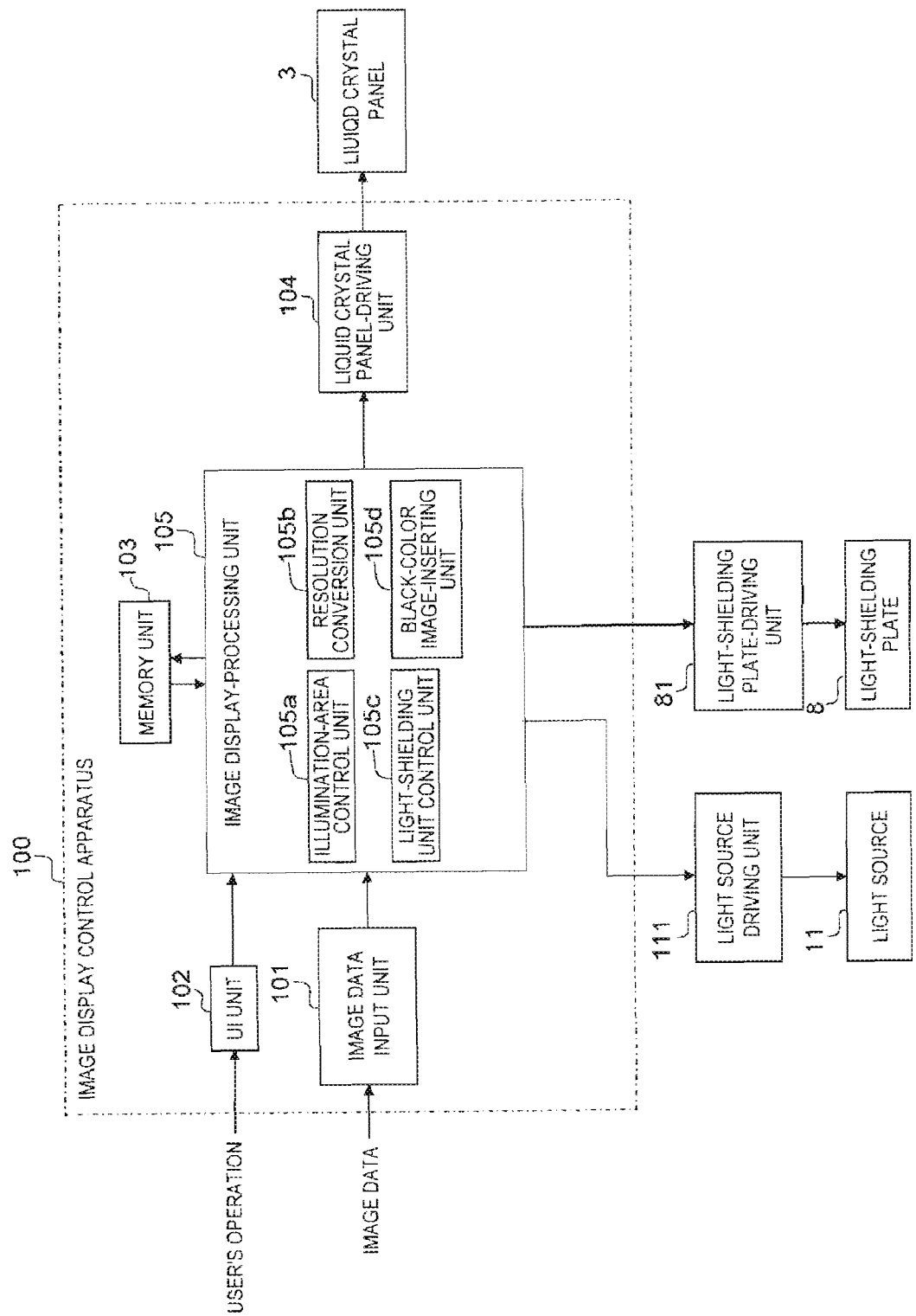
FIG. 14 is a diagram illustrating a configuration of the direct viewing type image display control apparatus used in the image display apparatus according to the fifth embodiment.

FIG. 14 is a diagram illustrating a configuration of the direct viewing type image display control apparatus used in the image display apparatus according to the fifth embodiment. An image display control apparatus 100 used in the direct viewing type image display apparatus according to the fifth embodiment includes an image data input unit 101 for inputting image data to be displayed; a user interface (UI) unit 102 for allowing every kind of configuration such as the screen size of the display surface 5 to be performed; a memory unit 103 for storing every kind of data required for the image display control apparatus 100; a liquid crystal panel-driving unit 104 for driving the liquid crystal panel 3, and an image display-processing unit 105 for performing every kind of process necessary to display an image.

The image display-processing unit 105 includes an illumination area control unit 105*a*, a resolution conversion unit 105*b*, a light-shielding unit control unit 105*c*, and a black-color image-inserting control unit 105*d*. In addition, it has a function of processing every kind of compensation such as color compensation, a function of processing configurations of a user through the user interface unit 102, and the like.

Like the projector according to the fourth embodiment, an LED array 15 and a light source driving unit 111 also serve as an illumination area modification unit in the image display apparatus according to the fifth embodiment. Consequently, like the projector according to the fourth embodiment, the illumination area control unit 105*a* in the image display apparatus according to the fifth embodiment controls the light source driving unit 111 at the time of configuring the specific image-forming area, so that only LEDs necessary to configure the specific image-forming area turn on. In addition, the illumination area control unit 105*a* controls the light source driving unit 111 at the time of illuminating the entire original image-forming area of the liquid crystal panel 3, so that all the LEDs turn on.

In above-mentioned configuration, the illumination area control unit 105*a*, for example, drives the light source driving unit 111 at the time of configuring the specific image-forming area shown in FIG. 2, so that the illumination area A2 is formed.

Figure 15:
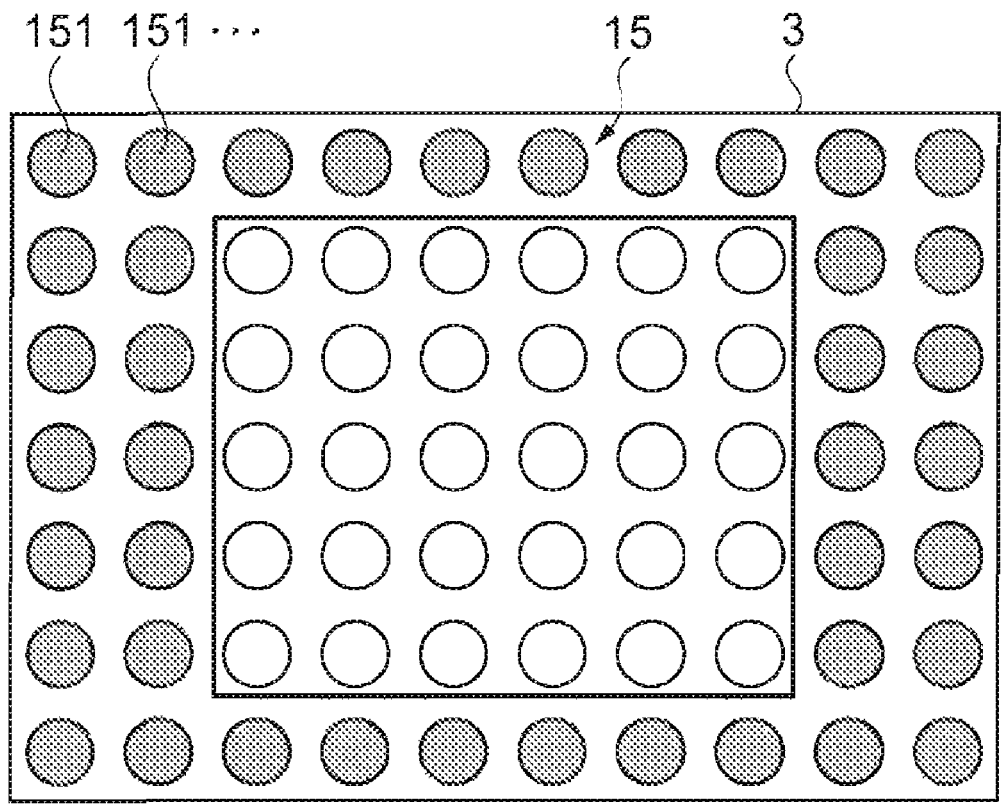
FIG. 15 is a diagram illustrating an example in which LEDs turn on at the time of configuring the specific image-forming area.

FIG. 15 is a diagram illustrating an example in which LEDs turn on at the time of configuring the specific image-forming area. The LEDs indicated by deep gray color represent the state of turning off, and those indicated by light gray color represents the state of the turning on in FIG. 15. In this manner, when the specific image-forming area is configured, only the LEDs illuminating the specific image-forming area turn on and the other LEDs turn off. When the entire original image-forming area of the liquid crystal panel 3 is illuminated, all the LEDs 151 shown in FIG. 15 turn on.

Like the projector according to the first to fourth embodiment, the specific image-forming area can be also configured in the image display apparatus according to the fifth embodiment. Accordingly, the screen size can be configured in liquid crystal TV with the large screen and the like in accordance with programs and the like.

Like each embodiment described above, it is desirable that the light-shielding unit is also provided in the image display apparatus according to the fifth embodiment at the time of configuring the specific image-forming area, so that light is not irradiated onto the area other than the specific image-forming area, or example, the liquid crystal panel, the electrochromic glass, and the like capable of switching light transmissivity to nearly 0% or nearly 100% which serve as the light-shielding unit can be used as the light-shielding plate 8. The black-color image can be also inserted onto the area other than the specific image-forming area. In addition, the insertion of the black-color image and the light-shielding plate 8 can be combined, so that the specific image-forming area can be more appropriately configured.

The image display apparatus according to the fifth embodiment can also modify the positions of the specific image-forming areas on the original image-forming area of the liquid crystal panel 3 every predetermined time as shown in FIGS. 7A to 7D.

In the image display apparatus according to the fifth embodiment, the illumination area control unit 105*a* can also control the light source driving unit 111, so that the positions of the specific image-forming areas are changeable as shown in FIGS. 7A to 7D. That is, the light source driving unit 111 is controlled to turn on, so that the specific image-forming area is formed on the position shown in FIG. 7A at some time, and the light source driving unit 111 is controlled to turn on, so that the specific image-forming area is formed on the position shown in FIG. 7B at some time. In this manner, the positions of the specific image-forming areas are changeable every predetermined time as shown in FIGS. 7A to 7D.

The invention is not limited to the described embodiment, but may be modified in various forms without departing from the gist of the invention. For example, as the light-shielding unit, it is desirable that both of the light-shielding plate and the insertion of the black-color image can be used, but any one of the light-shielding plate and the insertion of the black-color image may be used.

In addition, the switching operation of the size of the screen can be configured at his disposal in each embodiment, but the image display-processing unit 105 can automatically configure the screen size in accordance with images to be displayed as well. Two types of size that are the sizes of the original screen size (the large screen size) and the small screen size are described in the above embodiments, but the small screen size can be also configured as several types of size.

The entire disclosure of Japanese Patent Application Nos. 2006-109468, filed Apr. 12, 200X and 2007-41843, filed Feb. 22, 2007 are expressly incorporated by reference herein.

What is claimed is:

1. An image display apparatus having an illumination optical system and a projection optical system comprising:
    a light source;
    a light modulation element modulating illumination light coming from the light source on the basis of image data;
    an illumination area modification unit capable of reducing an illumination area for the light modulation element in order to illuminate a specific image-forming area in the image-forming area of the light modulation element, the specific image-forming area having a smaller size than an original image-forming area;
    an illumination optical system-optical axis-moving unit capable of translating an optical axis of the illumination optical system;
    a projection optical system-optical axis-moving unit capable of translating an optical axis of the projection optical system; and
    an image display-processing unit having an illumination area control unit for controlling the illumination area modification unit, a resolution conversion unit for converting a resolution of the image data into a resolution corresponding to the specific image-forming area, a first optical axis-moving unit control unit for controlling the illumination optical system-optical axis-moving unit, and a second optical axis-moving unit control unit for controlling the projection optical system-optical axis-moving unit,
    wherein the image display apparatus is a projector equipped with the illumination optical system having the light source and the projection optical system for projecting light modulated by the light modulation element, and
    the position of the specific image-forming area on the image-forming area of the light modulation element is changeable every predetermined time by translating the optical axis of the illumination light outputted from the illumination optical system.

2. The image display apparatus according to claim 1, further comprising:
    a light-shielding unit capable of shielding an area other than the specific image-forming area,
    wherein the image display-processing unit has a light-shielding control unit controlling the light-shielding unit so as to shield the area other than the specific image-forming area from light at the time of controlling the illumination area modification unit to reduce the illumination area.

3. The image display apparatus according to claim 1, wherein the image display-processing unit has a black image-inserting control unit inserting a black-color image onto the area other than the specific image-forming area at the time of controlling the illumination area modification unit to reduce the illumination area.

4. The image display apparatus according to claim 1, wherein the center of the specific image-forming area is positioned at or in the vicinity of the center of the image-forming area of the light modulation element.

5. The image display apparatus according to claim 1, wherein the image display-processing unit has a function of controlling an output of the light source, and controls the output of the light source at the time of controlling the illumination area modification unit to reduce the illumination area so as to be smaller than that where the illumination area modification unit does not reduce.

6. The image display apparatus according to claim 1, wherein the change in the position every predetermined time takes place by moving the light modulation element on a plane perpendicular to the optical axis of illumination light entering the light modulation element.

7. The image display apparatus according to claim 1, wherein a movement of the optical axis of the projection optical system is controlled so that the center of a display image on a display surface is positioned at or in the vicinity of the center of the display surface at the time of translating the optical axis of the illumination light outputted from the illumination optical system.

8. The image display apparatus according to claim 1, wherein the illumination optical system has a zoom lens, and the illumination area modification unit reduces the illumination area by changing a zoom ratio of the zoom lens.

9. The image display apparatus according to claim 1, wherein the projection optical system is of a fixed focus type.

10. The image display apparatus according to claim 1, wherein the image display apparatus has a display surface for displaying an image projected from the projection optical system thereon.

11. The image display apparatus according to claim 1, wherein the image display apparatus is of a direct viewing type, and is provided with the plurality of light sources; and
wherein the illumination area modification unit controls turning on and off of only the light source corresponding to the specific image-forming area among the plurality of light sources so that the illumination area modification unit enables the light modulation element to reduce the illumination area.

12. An image display control apparatus used in an image display apparatus having an illumination optical system and a projection optical system which has a light source; a light modulation element modulating illumination light coming from the light source on the basis of image data; an illumination area modification unit that can reduce an illumination area of the light modulation element in order to illuminate a specific image-forming area in the image-forming area of the light modulation element; an illumination optical system-optical axis-moving unit capable of translating an optical axis of the illumination optical system; and a projection optical system-optical axis-moving unit capable of translating an optical axis of the projection optical system, the image display control apparatus comprising:
an image display-processing unit having an illumination area control unit for controlling the illumination area modification unit, a resolution conversion unit for converting a resolution of the image data into a resolution corresponding to the specific image-forming area, a first optical axis-moving unit control unit for controlling the illumination optical system-optical axis-moving unit, and a second optical axis-moving unit control unit for controlling the projection optical system-optical axis-moving unit, wherein the specific image-forming area has a smaller size than an original image-forming area,
the image display apparatus is a projector equipped with the illumination optical system having the light source and the projection optical system for projecting light modulated by the light modulation element, and
the position of the specific image-forming area on the image-forming area of the light modulation element is changeable every predetermined time by translating the optical axis of the illumination light outputted from the illumination optical system.

13. The image display device according to claim 8, wherein the zoom lens is disposed between the light source and the light modulation element.

14. The image display control apparatus according to claim 12, wherein the image display apparatus is a projector equipped with an illumination optical system having a zoom lens disposed between the light source and the light modulation element; and
the image display-processing unit controls the illumination area modification unit to reduce the illumination area of the light modulation element by changing a zoom ratio of the zoom lens.

15. The image display apparatus according to claim 2, wherein the light-shielding unit is configured to shield an area between a perimeter of the specific image-forming area and a perimeter of the original image-forming area.

16. The image display apparatus according to claim 1, wherein the change in the position every predetermined time takes place by translating the optical axis of the illumination optical system and the projection optical system in a first direction or a second direction.

* * * * *